United States Patent
Yun et al.

(10) Patent No.: US 6,480,445 B1
(45) Date of Patent: Nov. 12, 2002

(54) OPTICAL DISK REPRODUCING APPARATUS AND METHOD HAVING IMPROVED SERVO CONTROL

(75) Inventors: In-Hyun Yun, Kyunggi-do (KR); Seong-Ju Lee, Kyunggi-do (KR); Dong-Seok Bae, Kyunggi-do (KR); Bok-Hyun Pack, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/382,789

(22) Filed: Aug. 25, 1999

(30) Foreign Application Priority Data

Aug. 25, 1998 (KR) .............................................. 98-35061

(51) Int. Cl.⁷ ................................................. G11B 7/09
(52) U.S. Cl. ............................... 369/44.32; 369/53.12; 369/53.15
(58) Field of Search ........................ 369/44.27, 44.28, 369/44.32, 44.29, 44.35, 44.34, 47.1, 53.1, 53.11, 53.12, 53.13, 53.14, 53.15, 53.2, 53.35, 53.41

(56) References Cited

U.S. PATENT DOCUMENTS 5,195,076 A * 3/1993 Aoki .................... 369/44.32 X
5,412,636 A * 5/1995 Hashimoto et al. ...... 369/44.32
6,282,157 B1 * 8/2001 Kim et al. ............... 369/44.35

* cited by examiner

Primary Examiner—Muhammad Edun
(74) Attorney, Agent, or Firm—Birch, Stewart, Kolasch & Birch, LLP

(57) ABSTRACT

Usable in an optical disk player, a servo device and a servo method for an optical disk using a plurality of beams prevent a servo error due to a defect of the optical disk by forming two beam spots on a single track of the optical disk and selectively switching to perform a servo controlling in accordance with a lagging beam spot when a defect of the disk is detected during the servo controlling in accordance with a leading beam spot.

40 Claims, 8 Drawing Sheets

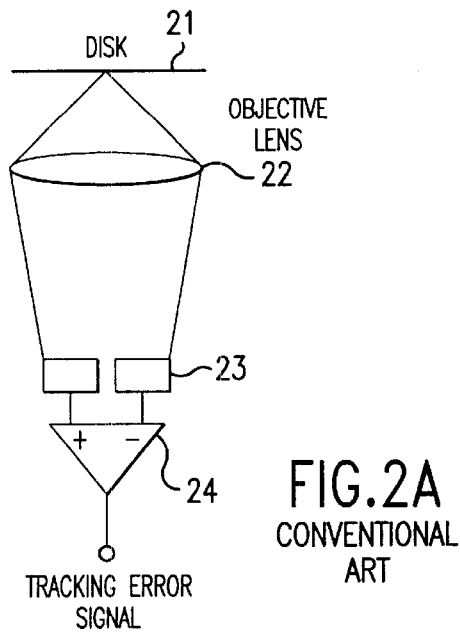
FIG.2A
CONVENTIONAL ART
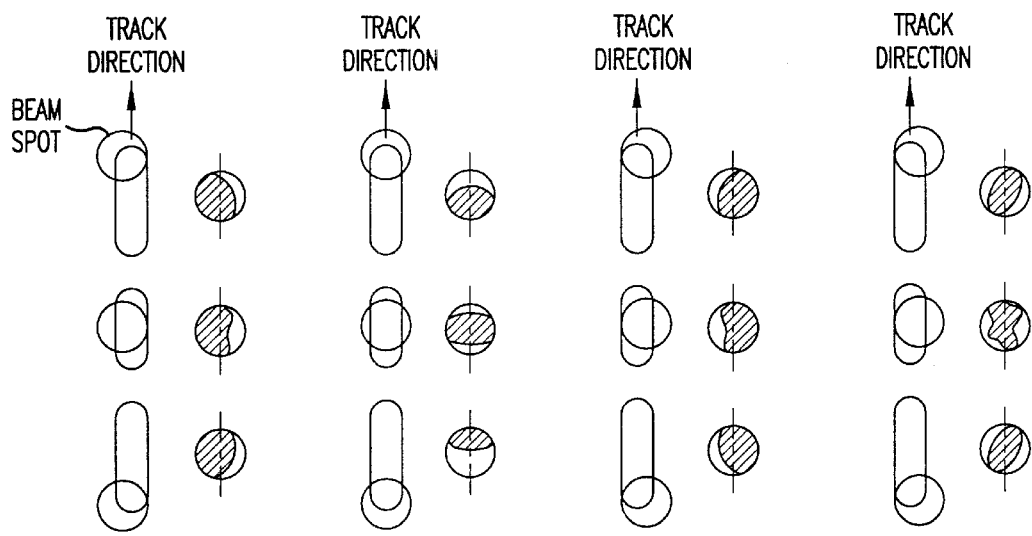
FIG.2B CONVENTIONAL ART
FIG.2C CONVENTIONAL ART
FIG.2D CONVENTIONAL ART
FIG.2E CONVENTIONAL ART

OPTICAL DISK REPRODUCING APPARATUS AND METHOD HAVING IMPROVED SERVO CONTROL

BACKGROUND OF THE INVENTION

1. Field of the Invention

The present invention relates to an optical disk reproducing apparatus and method, and more particularly, an optical disk reproducing apparatus and method having improved servo control.

2. Description of the Related Art

Generally, an optical disk player reproducing an optical disk in which digital data are written with an MPEG system is provided with, as shown in FIG. 1, a pick-up 3 detecting a signal recorded in the optical disk 1 by irradiating a laser beam through a light emitting laser diode, a sled motor 4 moving the pick-up 3 in a radial direction of the optical disk 1, a spindle motor 2 rotating the optical disk 1, a driver 6 driving the sled motor 4 and the spindle motor 2, an R/F unit 5 converting a signal detected from the pick-up 3 into a binary signal, a servo unit 7 controlling the driver 6 in accordance with a focus error signal FE, a tracking error signal TE, and a rotation speed of the optical disk 1, a digital signal processing unit 8 converting the binary signal into a digital data and then restoring the digital data which are compressed video/audio data, an MPEG decoder 9 decoding the compressed video/audio data for output, a microcomputer 11 controlling data flow in the optical disk player, and a memory 12 storing data temporarily therein.

With reference to FIG. 1, a method for detecting a signal written in the optical disk player will be described in detail.

The pick-up 3 continuously detects signals written in the tracks of optical disk 1 while the optical disk 1 is rotating, and the R/F unit 5 filters and shapes a high frequency signal detected by the pick-up 3 into a binary signal. The binary signal, which has only two levels, i.e., high and low state, is restored to the original digital data by the DSP 8, and the restored data is decoded into moving picture data by MPEG decoder 9. During reproduction, the servo 7 outputs a servo-control signal to the driver 6 to perform tracking and focusing. This servo control operation is performed in accordance with a tracking error signal and a focusing error signal that are obtained photoelectrically by a light receiving circuit, which includes a photodiode PD, in the pick-up 3.

The microcomputer 11 controls the servo 7 to perform the tracking or focusing operation of the pick-up 3, and controls the MPEG decoder 9 to generate output in accordance with the key commands requested from a user; whereby the moving picture data can be stably reproduced and searched.

In such an optical disk player, the tracking and focusing control are the important servo operations which determine the stability of the moving picture data output. Push-pull and a differential phase detection (DPD) servo control methods are generally adopted in the conventional art. Description will be made in detail with respect to the push-pull and the DPD methods, respectively.

FIGS. 2A and 2F illustrate the servo-control operation, particularly, the tracking operation according to the conventional art. In the push-pull method, as shown in FIG. 2A, a beam spot formed on a track of the disk 21 passes through an object lens 22 and is photoelectrically converted by a bipartite optical detector 23, in which a photodiode is divided into two parts. The photoelectrically converted electric signal is subtracted and amplified by a differential amplifier 24 and is outputted as a tracking error signal.

FIGS. 2B to 2E illustrate various tracking states of the beam spot as the beam spot moves in the track direction. Specifically, FIG. 2B illustrates that the beam spot moves in the track direction, but is slanted to the left. Here, the right side of the bipartite optical detector 23 detects the beam spot more brightly than the left side, whereby the tracking error signal has a positive (+) output. Accordingly, the servo 7 outputs a tracking control signal to move the beam spot to a center of the track. In FIG. 2C, the beam spot moves in the track direction and is placed in the center of track. The beam spot detected by the bipartite optical detector 23 has evenly distributed brightness so that the tracking control operation maintains the tracking error signal in the current state. FIG. 2D illustrates that the beam spot moves in the track direction, but is slanted to the right. Here, contrary to FIG. 2B, the left side of the bipartite optical detector 23 detects the beam spot more brightly than the right side, whereby the tracking error signal has a negative (−) output. Thus, the servo 7 outputs a corresponding tracking control signal to move the beam spot to the center of the track. Eventually, the servo 7 outputs the tracking control signal to move the beam spot to the center of the track, whereby the tracking error signal from the bipartite optical detector 23 becomes zero.

However, when the depth of the pits formed in the optical disk becomes ¼ of a wavelength $\lambda$ of the laser beam, that is ¼$\lambda$, although the beam spot is slanted to the right while moving in the track direction, the beam spot detected by the bipartite optical detector 23 may have symmetrically identical brightness as shown in FIG. 2E. Consequently, the tracking error signal, i.e., the output signal of the bipartite optical detector 23, becomes zero, so that it is mistakenly considered that no tracking correction is required, which leads to a tracking error.

FIG. 2F illustrates the DPD method in the conventional art, and the tracking-control operation according to the DPD method will now be described.

Electric signals received from an optical detector 30, which is quartered, are A, B, C and D, respectively. These signals are combined into (A+C)+(B+D) and (A+C)−(B+D), respectively, by amplifiers 31,32, and 33 and a differential amplifier 34. The signal (A+C)+(B+D) is applied to the R/F unit 5 and then outputted as a binary signal, while the signal (A+C)−(B+D), which is a tracking error signal, is applied to the servo 7 and used for tracking control.

FIGS. 2G–2I illustrate various tracking states of the beam spot as the beam spot moves in the track direction. As shown in FIG. 2G, the beam spot detected in the quartered optical detector 30 has symmetrically even brightness as in FIG. 2E. By differentially amplifying two electric signals, each signal being the sum of two signals from two diagonally positioned quarters of the of the quartered optical detectors 30, the tracking error signal (A+C)−(B+D) is negative (−). Tracking control, which moves the beam spot toward the center of the track, therefore, occurs. In FIG. 2H, the left and right sides of the tracking error signal have even light brightness, but in the diagonal direction the tracking error signal has different brightness, so that the tracking error signal (A+C)−(B+D) is negative (−). In FIG. 2I, the tracking error signal (A+C)−(B+D) is also negative (−), and thus tracking control is accomplished so that the beam spot moves to the center of the track, thereby resolving the problems with the push-pull method.

However, since both the conventional push-pull and DPD methods perform the servo-control operation using a single beam spot, there is a problem in that servo errors, that is tracking and focusing errors, occur when the disk has a defect such as stained blots or scratches on the track of the optical disk.

SUMMARY OF THE INVENTION

An object of the present invention is to provide a servo device and method for an optical disk using a plurality of beams that prevents a servo error caused by a defect on the optical disk.

These and other objects are achieved by providing an optical disk reproducing apparatus, comprising a pick-up forming at least a first beam spot on an optical disk, and receiving a reflection of said first beam spot; a servo signal generator generating first servo signals from said reflected first beam spot; a defect detector detecting defects in said optical disk; and a servo controller servo controlling said pick-up based on said first servo signals and output of said defect detector.

These and other objects are further achieved by providing an optical disk reproducing apparatus, comprising a pick-up forming a plurality of beam spots on an optical disk, and receiving reflections of said beam spots; a servo signal generator generating servo signals associated with and based on at least one of said reflected beam spots; and a servo controller selecting servo signals associated with one of said beam spots and servo controlling said pick-up based on said selected servo signals.

These and other objects are still further achieved by providing a method of servo controlling in an optical disk reproducing apparatus, comprising forming at least a first beam spot on an optical disk; receiving a reflection of said first beam spot; generating first servo signals from said reflected first beam spot; detecting defects in said optical disk; and servo controlling said pick-up based on said first servo signals currently generated by said generating step and output of said detecting step such that said servo control of said pick-up is based on said currently generated first signals when said detecting step does not detect a defect and said servo control is not performed based on said currently generated first servo signals when said detecting step detects a defect.

These and other objects are additionally achieved by providing a method of servo controlling in an optical disk reproducing apparatus, comprising forming a plurality of beam spots on an optical disk; receiving reflections of said beam spots; generating servo signals associated with and based on each of said reflected beam spots; and selecting servo signals associated with one of said beam spots; and servo controlling said pick-up based on said selected servo signals.

BRIEF DESCRIPTION OF THE DRAWINGS

The accompanying drawings, which are included to provide a further understanding of the invention, illustrate preferred embodiments of this invention, and together with the description, serve to explain the principles of the present invention.

In the drawings.

DESCRIPTION OF THE PREFERRED EMBODIMENTS

With reference to the accompanying drawings, a servo device and method for an optical disk using a plurality of beams according to a preferred embodiment of the present invention will be described in detail.

Figure 1:
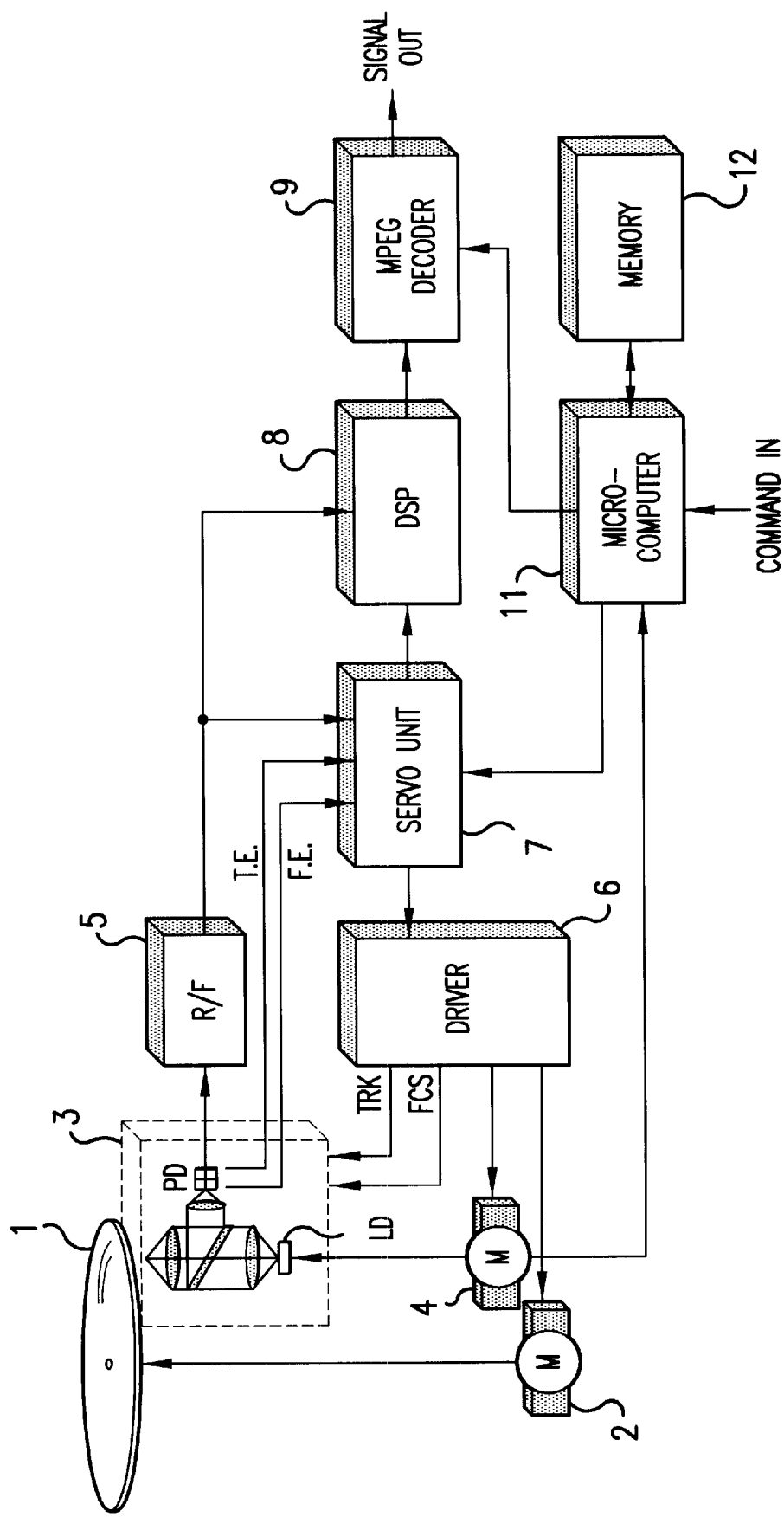
FIG. 1 is a schematic diagram illustrating a general optical disk player.
Figure 2F:
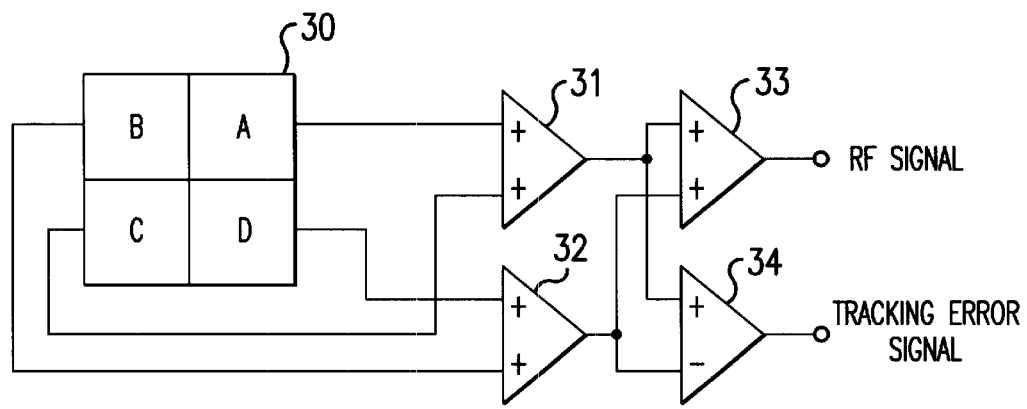
FIGS. 2A and 2I are schematic diagrams illustrating servo-control in the conventional art.
Figure 2G:
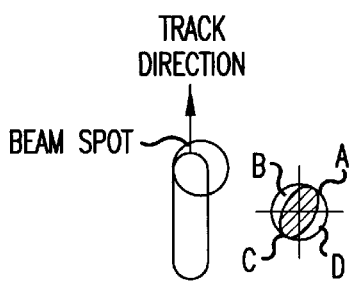
Figure 2H:
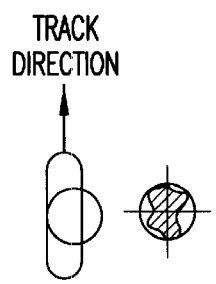
Figure 2I:
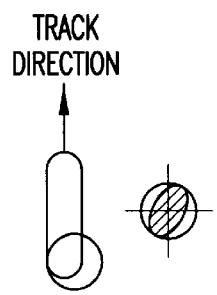
Figure 3:
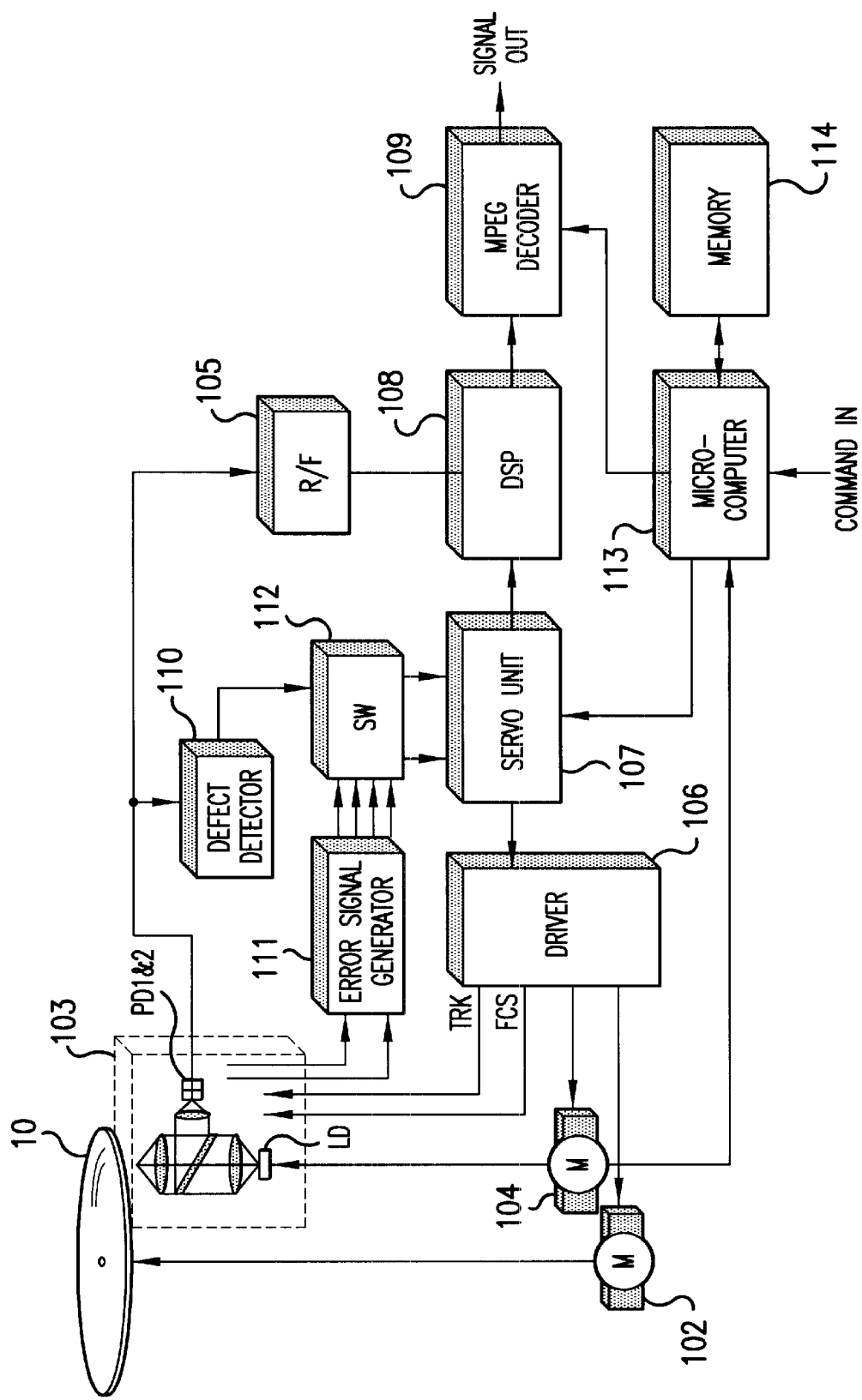
FIG. 3 is a schematic diagram illustrating an optical disk reproducing apparatus according to an embodiment of the present invention.

FIG. 3 is a schematic diagram illustrating an optical disk reproducing apparatus according to an embodiment of the present invention.

As shown therein, the optical disk reproducing apparatus includes an optical pick-up 103 separating a single beam irradiated from a laser diode LD into a couple of beams to form beam spots of a main beam and a sub beam on a single track of an optical disk 101 and detecting recorded signals from the reflected main and sub beams; a sled motor 104 moving the optical pick-up 103 in a radial direction of the optical disk 101; a spindle motor 102 rotating the optical disk 101; a driver 106 driving the sled motor 104 and the spindle motor 102; an R/F unit 105 converting a photoelectrically converted signal detected by the optical pick-up 103 into a binary signal; a couple of photodiodes PD 1 and PD 2 provided in the optical pick-up 103, respectively receiving reflected main and sub beams and photoelectrically converting them into electric signals; a servo unit 107 controlling a servo operation including tracking and focusing of the optical pick-up 103; a digital signal processing unit (DSP) 108 converting the binary signal into digital data and then restoring the digital data which are compressed video/audio data or text data; an MPEG decoder 109 decoding the compressed video/audio data; a microcomputer 113 controlling data flow in the optical disk.reproducing apparatus; a memory 114 storing data therein temporarily; a defect detecting unit 110 detecting a defect on the disk based on the level of an electric signal which has been photoelectrically converted in the photodiodes PD1 and PD2; a servo error signal generating unit 111 outputting a plurality of servo error signals by subtracting and adding electric signals produced from the main and sub beams by the photodiodes PD1 and PD2, respectively; and a multiplexer 112 selectively outputting one of the servo error signals.

Figure 4:
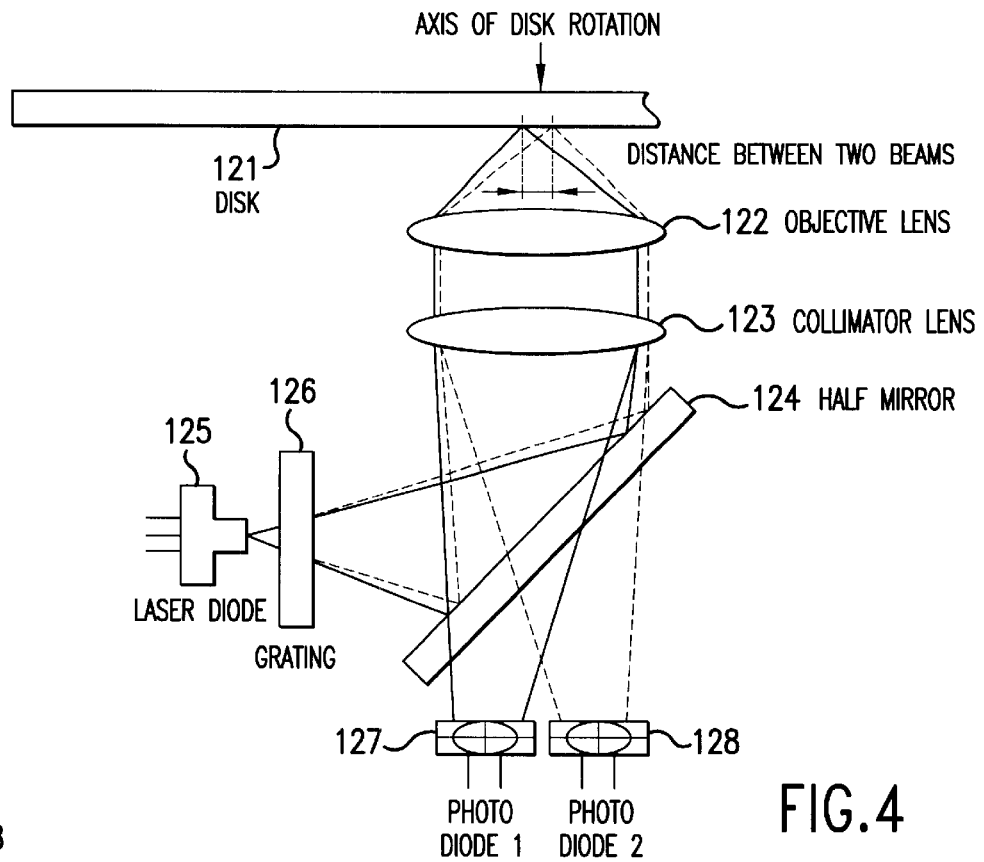
FIG. 4 is a schematic diagram illustrating a pick-up in the optical disk reproducing apparatus according to an embodiment of the present invention.
Figure 5:
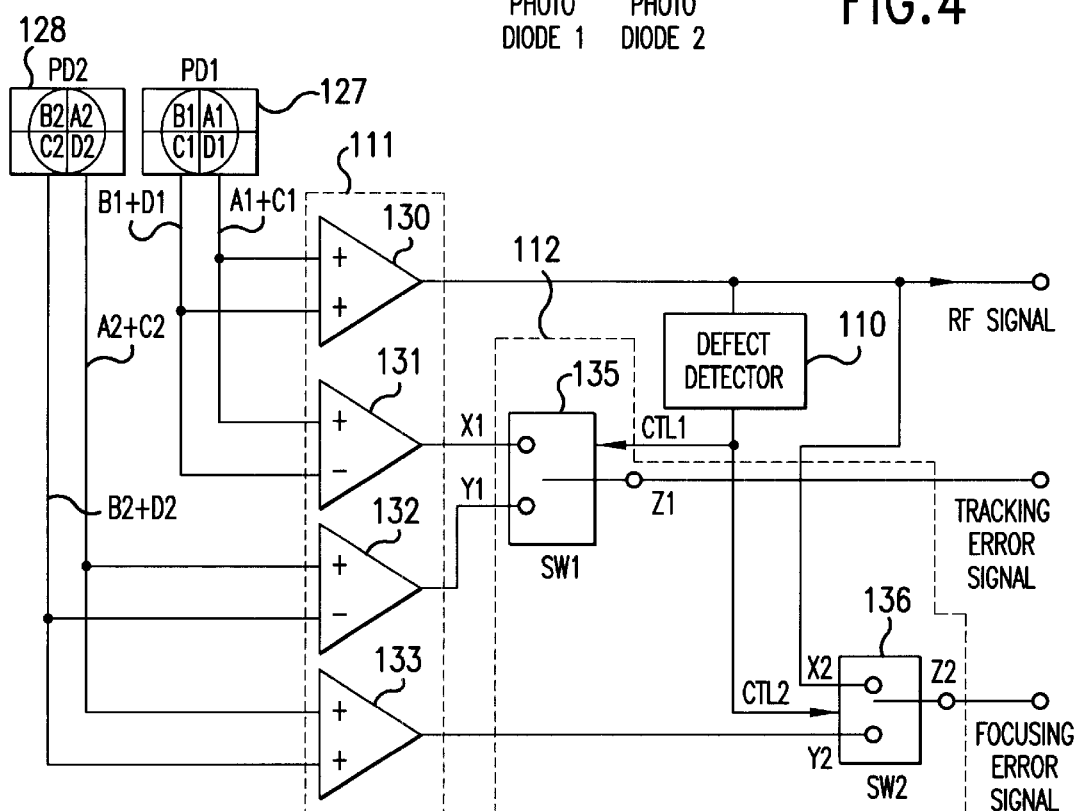
FIG. 5 is a schematic diagram illustrating a servo error signal generating part in the optical disk reproducing apparatus according to an embodiment of the present invention.

With reference to FIGS. 4 and 5, an operation of the servo device for the optical disk according to the preferred embodiment of the present invention will be described.

FIG. 4 is a detailed schematic diagram illustrating the optical pick-up 103 as shown in FIG. 3. As shown therein, a beam irradiated from a laser diode 125 is diffractively separated by a diffraction grating 126 to divide the beam into a leading main beam and a lagging sub beam. The main and sub beams are reflected towards an optical disk 121 by a half mirror 124. Then, the reflected main and sub beams are respectively converted to parallel light beams by a collimator lens 123 and the parallel lights are formed as a couple of beam spots by an objective lens 122 on the same track of the disk 121. The beam spots of the main and the sub beams are reflected back towards the objective lens 122 and the collimator lens 123. The two reflected beams pass through the half mirror 24 and are incident upon first and second photodiodes 127 and 128 (i.e., PD 1 and PD 2 in FIG. 3), respectively, each photodiode being a quartered optical detector.

FIG. 5 is a detailed schematic diagram illustrating the defect detector 110, the error signal generator 111, and the multiplexer 112.

As shown therein, the received rays of the main and sub beams detected in the first and second photodiodes 127 and 128 are outputted as electric signal (A1+C1), (B1+D1), (A2+C2), and (B2+D2) summed diagonally. Differential amplifiers 131 and 132 produce the signals (A1+C1)−(B1+D1) and (A2+C2)−(B2+D2), respectively, which serve as tracking error signals and are applied to input terminals X1 and Y1, respectively, of a switch 135. Amplifiers 130 and 133 produce the signals (A1+C1)+(B1+D1)and (A2+C2)+(B2+D2), which serve as tracking error signals and are applied to input terminals X2 and Y2, respectively, of a switch 136.

The signal (A1+C1)+(B1+D1) generated by the amplifier 130 is applied to a disk defect detecting unit 110. The disk defect detecting unit 110 detects a level of the applied signal (A1+C1)+(B1+D1) to determine if there exists a defect on a current track of the optical disk. When the detected level of the signal (A1+C1)+(B1+D1) is below a predetermined level, the defect detecting unit 110 outputs a switching control signal to change the output signal of the switches 135 and 136 from input signals on X1 and X2 to input signals on Y1 and Y2, respectively.

The switches 135 and 136 output the signal applied to the terminals Y1 and Y2, respectively, in accordance with the switching control signal, whereby the tracking error signal and the focusing error signal (A2+C2)−(B2+D2)and (A2+C2)+(B2+D2) are inputted to the servo unit 107. Accordingly, the servo unit 107 controls the servo operation of the optical pick-up 103 so that the tracking control and the focusing control are accomplished in accordance with the tracking error signal (A2+C2)−(B2+D2) and the focusing error signal(A2+C2)+(B2+D2), both of them being generated from the lagging or sub beam spot, which is not in the defect zone.

Figure 6:
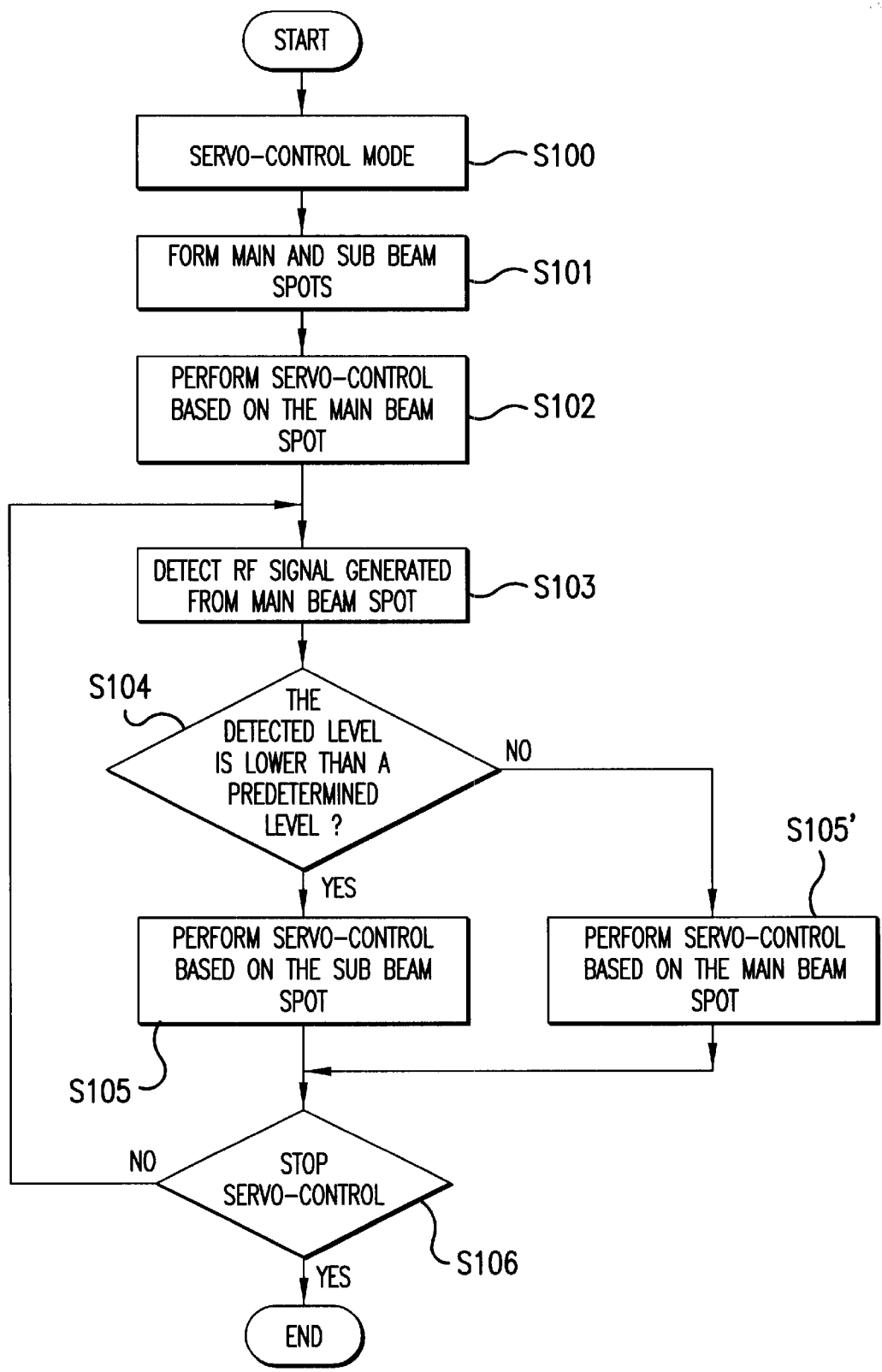
FIG. 6 is a flowchart illustrating servo-control according to a servo control method according to an embodiment of the present invention.

FIG. 6 is a flowchart illustrating a servo control operation according to an embodiment of the present invention.

As shown therein, first in a servo control mode (S100) beam spots of a main beam and a sub beam are incident on a same track (S101), the servo-control operation is performed based upon the detected signal from the beam spot of the main beam (S102), and the RF signal is detected from the signal (A1+C1)+(B1+D1) generated from the main beam spot (S103). When a defect on a current track is detected (S104), the mode is switched (S105) so that the servo operation is performed based on the signals generated from the sub beam spot. In the servo-control mode, the defect defecting unit 110 continues to monitor the signal (A1+C1)+(B1+D1). If the level of signal (A1+C1)+(B1+D1) becomes greater than the pre-determined level again, the defect defecting unit 110 controls the switches 135 and 136 to return the signal paths from Y1-Z1 and Y2-Z2 to X1-Z1 and X2-Z2, respectively (S105'). If no defect is detected (S104), then servo-control continues based on the signals generated from the main beam spot (S105'). The servo control operation based on either beam spot is performed until the end of reproduction (S106).

Figure 7:
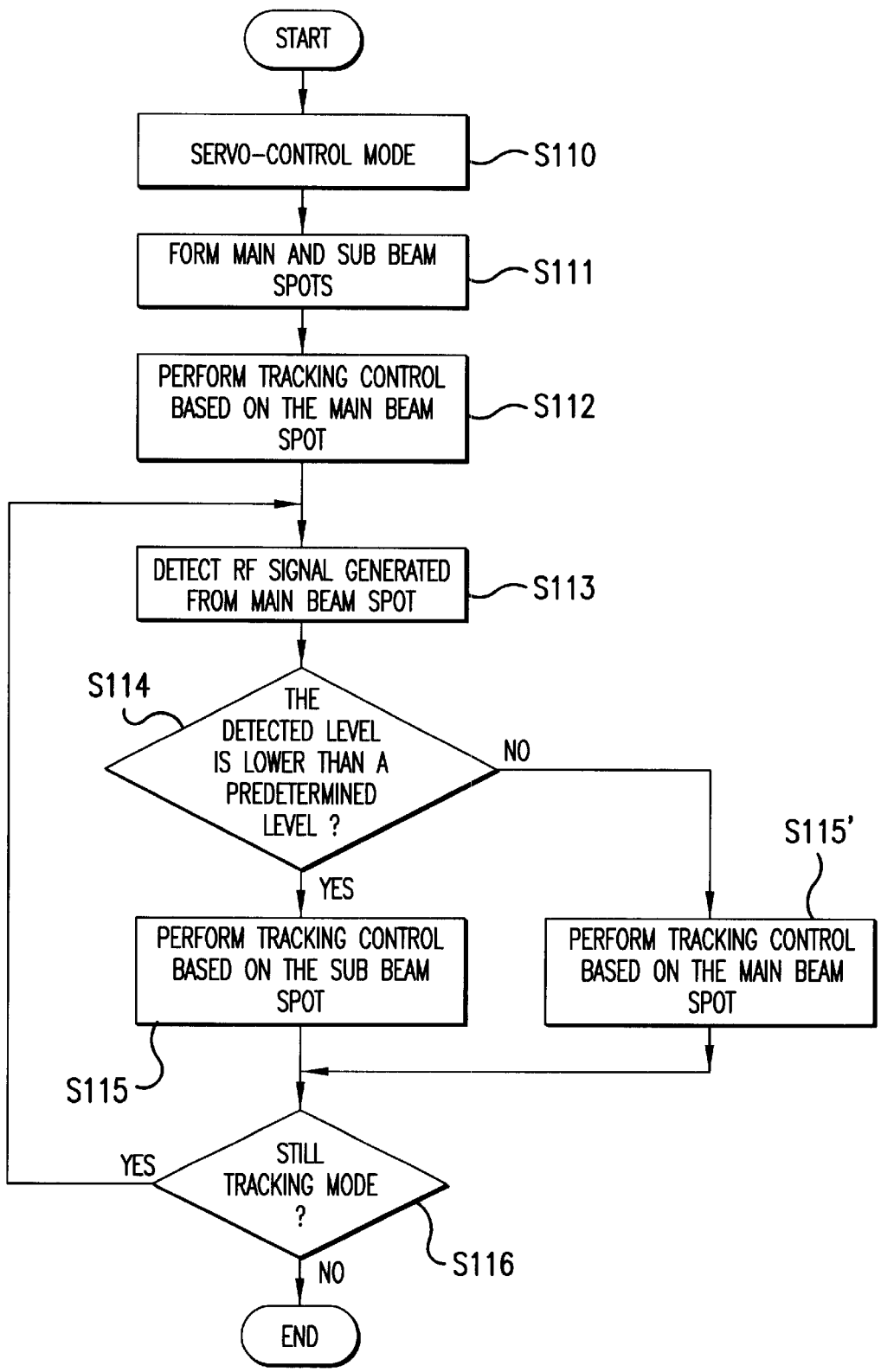
FIG. 7 is a flowchart illustrating tracking control in a servo control method according to an embodiment of the present invention.

More specifically, FIG. 7 is a flowchart illustrating the tracking control operation according to the embodiment of the present invention.

As shown therein, in a servo control mode (S110) a main beam and a sub beam are incident on a single track of the optical disk (S111) and the tracking control operation is performed (S112) so that the tracking error signal (A1+C1)−(B1+D1) generated from the main beam becomes zero. Then, the RF signal from the signal (A1+C1)+(B1+D1) is detected (S113). When the detected level of the RF signal drops below the predetermined level, it is determined that there is a defect on the current track of the optical disk (S114). As a result, the tracking error signal (A2+C2)−(B2+D2) generated from the sub beam is used to perform tracking control (S115). If no defect is detected or if a defect is no longer detected ((A1+C1)+(B1+D1)≧predetermined level), tracking control is performed based on the signals generated from the main beam (S115'). Next, it is determined if the tracking mode continues (S116). If so, processing returns to step S113.

Figure 8:
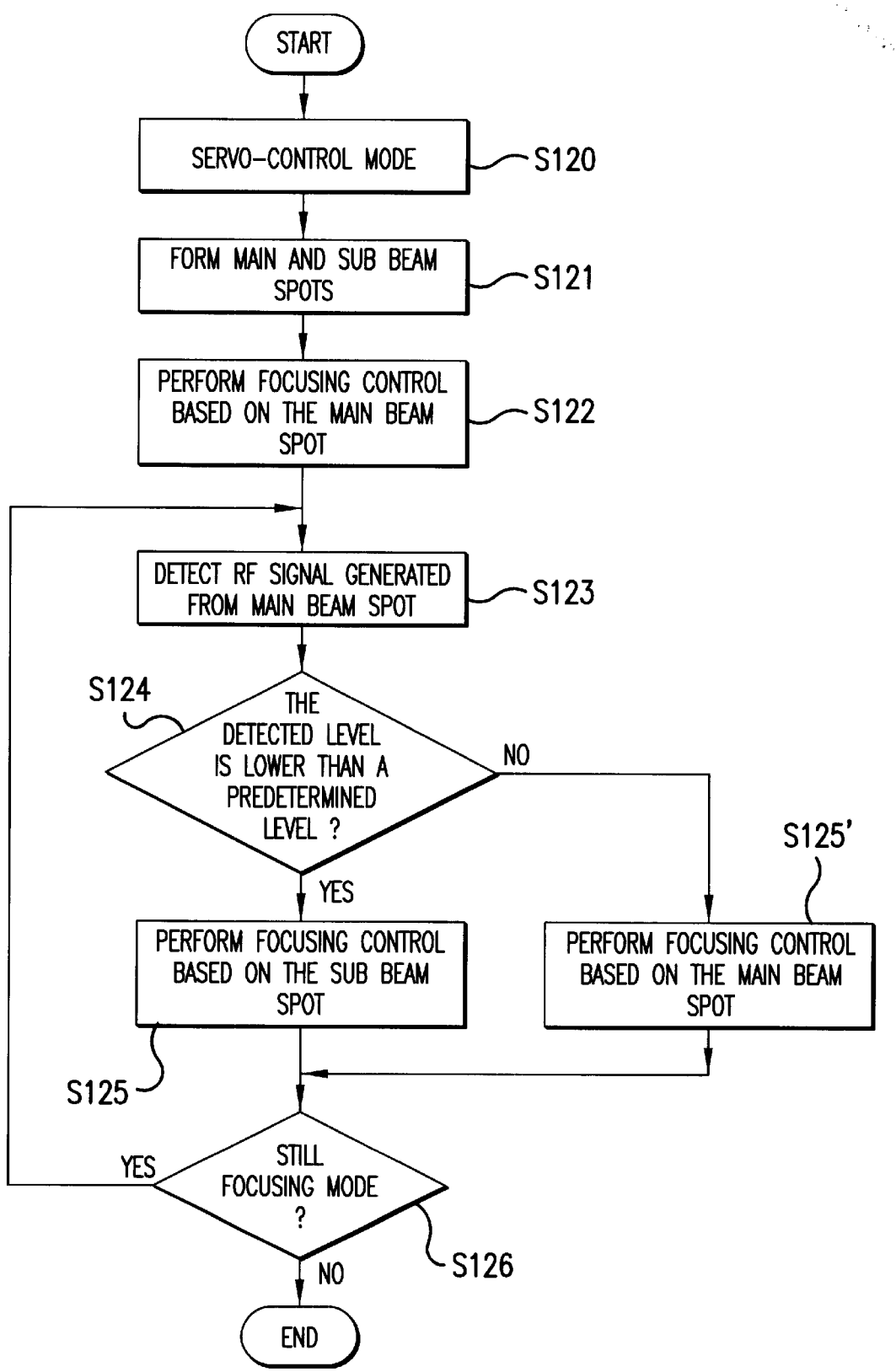
FIG. 8 is a flowchart illustrating focusing control in a servo control method according to an embodiment of the present invention.

FIG. 8 is a flowchart illustrating the focusing control operation according to an embodiment of the present invention.

As shown therein, in a servo control mode (S120) a main beam and a sub beam are incident on a same track of the optical disk (S121) and the focusing control operation is performed (S122) so that the focusing error signal (A1+C1)+(B1+D1) generated from the main beam becomes greater than the predetermined level. Then, the level of this RF signal is detected (S123). When the detected level of the RF signal is lower than the predetermined level, it is determined that there is a defect on the current track of the optical disk (S124). As a result, focusing control is performed based on the focusing error signal (A2+B2)+(B2+D2) generated from the sub beam (S125). If no defect is detected or if a defect is no longer detected ((A1+C1)+(B1+D1)≧predetermined level), then focusing control continues based on the signals generated from the main beam (S124'). Next, it is determined if the focusing mode continues (S126). If so, processing returns to step S123.

In accordance with the above-described operation, the servo device for the optical disk according to the present invention enables accurate servo-control by selectively adopting the servo error signal from a beam spot, other than the main beam, formed on the same track as the main beam when a defect on the optical disk is encountered during the servo operation. Accordingly, servo control is performed based on a beam spot which has not yet entered the defect zone.

The optical disk reproducing apparatus and method according to the present invention reduce the servo-control errors caused by stained blots or track damage such as a scratch on the track of the optical disk, thereby accomplishing a more accurate servo operation, and more effectively preventing servo-control errors in a high-density optical disk player.

According to the above-explained embodiment of the present invention, two separate beams scan a same track. However, in an alternative embodiment, the two beams scan two neighboring tracks. In this case, one beam lags the other beam by one track. The signals generated from the lagging beam are used by the error signal generated 111 and the RF unit 105, but defects are detected by the detect detector 110 using the signals generated from the non-lagging beam. If a defect is detected, a microcomputer 11 memorizes the information on the defect state such as start/end location, a length of the defect zone and the information on tracking error signal and focusing error signal generated from the lagging beam just before the defect. Namely, from the non-lagging beam the start/end and length of the defect are determined. The start of the defect is where the signal (A1+C1)+(B1+D1) falls below the predetermine threshold, and the end of the defect is where the signal (A1+C1)+(B1+D1) returns to the predetermined threshold or above. Just before the lagging beam spot arrives at the start of the defect, the information on the tracking and focusing error signals generated from the lagging beam are stored. When the lagging beam spot arrives at the start location of the defect zone, the tracking and focusing error signals are corrected for the duration of the defect by using the stored information on the tracking error and focusing error signals.

In a further alternative, the lagging and non-lagging beam spot scan neighboring tracks and lie.substantially along a same radial line perpendicular to the tracks of the optical disk. The operation in this embodiment is the same as described in FIGS. 6–8, wherein tracking and focusing of the main beam are performed based on the tracking and focusing error signals generated from the sub or lagging beam.

The above described embodiments are not limited to using two beams. Instead, the number of beams can be increased. Additionally, the above described embodiments could be combined.

In yet another embodiment of the present invention, a single beam spot is used. In this embodiment, the tracking and focusing error signals generated from the single beam supplied to the X1 and X2 inputs, respectively, and output from the first and second switches 135 and 136 are stored and fed back to the Y1 and Y2 inputs of the first and second switches 135 and 136. When a defect is detected, the first and second switches 135 and 136 output the stored tracking and focusing error signals at the Y1 and Y2 inputs. The first and second switches 135 and 136 return to outputting the tracking and focusing error signals at the X1 and X2 inputs after the beam spot passes the defect as indicated by the defect detector 110.

It will be apparent to those skilled in the art that various other modifications and variations can be made in the servo device and method for optical disks according to the present invention without departing from the spirit or scope of the invention. Thus, it is intended that the present invention cover the modifications and variations of this invention provided they come within the scope of the appended claims and their equivalents.

What is claimed is:

1. An optical disk reproducing apparatus, comprising:
   a pick-up forming at least a first beam spot on an optical disk, and receiving a reflection of said first beam spot;
   a servo signal generator generating first servo signals from said reflected first beam spot;
   a defect detector detecting defects in said optical disk; and
   a servo controller servo controlling said pick-up based on said first servo signals and output of said defect detector,
   wherein said servo controller servo controls said pick-up based on said first servo signals currently generated by said servo signal generator and output of said defect detector such that said servo control of said pick-up is based on said currently generated first signals when said defect detector does not detect a defect and said servo control is not performed based on said currently generated first servo signals when said defect detector detects a defect, and
   wherein said pick-up forms at least said first beam spot and a second beam spot on a same track of said optical disk such that said second beam spot lags behind said first beam spot, and receives said reflected first beam spot and a reflection of said second beam spot; said servo signal generator generates said first servo signals and second servo signals based on said reflected first and second beam spots, respectively; and said servo controller servo controls said pick-up based on said first servo signals when said defect detector does not detect a defect, and servo controls said pick-up based on said second servo signals when said defect detector detects a defect.

2. The apparatus of claim 1, wherein said servo controller stores said currently generated first servo signals, and servo controls said pick-up based on said stored first servo signals generated prior to said first beam spot scanning a defect when said defect detector detects a defect.

3. The apparatus of claim 1, wherein said defect detector detects defects based on said first servo signals.

4. The apparatus of claim 1, further comprising:
   an RF unit generating an RF signal based on said first servo signals.

5. The apparatus of claim 1, wherein
   said first servo signals include a tracking error signal and a focusing error signals; and
   said servo controller performs tracking control and focusing control of said pick-up as said servo control.

6. The apparatus of claim 5, wherein said defect detector detects a defect when said focusing error signal falls below a predetermined threshold.

7. An optical disk reproducing apparatus, comprising:
   a pick-up forming at least a first beam spot on an optical disk, and receiving a reflection of said first beam spot;
   a servo signal generator generating first servo signals from said reflected first beam spot;
   a defect detector detecting defects in said optical disk; and
   a servo controller servo controlling said pick-up based on said first servo signals and output of said defect detector,
   wherein said servo controller servo controls said pick-up based on said first servo signals currently generated by said servo signal generator and output of said defect detector such that said servo control of said pick-up is based on said currently generated first signals when said defect detector does not detect a defect and said servo control is not performed based on said currently generated first servo signals when said defect detector detects a defect, and
   wherein said pick-up forms at least said first beam spot and a second beam spot on different tracks of said optical disk, and receives said reflected first beam spot and a reflection of said second beam spot;
   said servo signal generator generates said first servo signals and second servo signals based on said reflected first and second beam spots, respectively; and
   said servo controller servo controls said pick-up based on said first servo signals when said defect detector does not detect a defect, and servo controls said pick-up based on said second servo signals when said defect detector detects a defect.

8. The apparatus of claim 7, wherein said defect detector detects defects based on said first electrical signals.

9. The apparatus of claim 7, further comprising:
   an RF unit generating an RF signal based on said first servo signals.

10. The apparatus of claim 7, wherein said first servo signals include a tracking error signal and a focusing error signals; and said servo controller performs tracking control and focusing control of said pick-up as said servo control.

11. The apparatus of claim 10, wherein said defect detector detects a defect when said focusing error signal falls below a predetermined threshold.

12. An optical disk reproducing apparatus, comprising:

a pick-up forming at least a first beam spot on an optical disk, and receiving a reflection of said first beam spot;

a servo signal generator generating first servo signals from said reflected first beam spot;

a defect detector detecting defects in said optical disk; and a servo controller servo controlling said pick-up based on said first servo signals and output of said defect detector, wherein said servo controller servo controls said pick-up based on said first servo signals currently generated by said servo signal generator and output of said defect detector such that said servo control of said pick-up is based on said currently generated first signals when said defect detector does not detect a defect and said servo control is not performed based on said currently generated first servo signals when said defect detector detects a defect, and wherein said pick-up forms at least said first beam spot and a second beam spot on different tracks of said optical disk such that said second beam spot scans a track before said first beam spot, and receives said reflected first beam spot and a reflection of said second beam spot;

said defect detector detects defects based on said reflected second beam spot; and said servo controller stores location information on a defect detected by said defect detector, stores said first servo signals generated prior to said first beam spot scanning a defect, determines when said first beam spot scans a defect based on said stored location information, servo controls said pick-up based on said first servo signals when said determination is that said first beam spot does not scan a defect, and servo controls said pick-up based on said stored first servo signals when said determination is that said first beam spot scans a defect.

13. The apparatus of claim 12, further comprising:

an RF unit generating an RF signal based on said first servo signals.

14. The apparatus of claim 12, wherein said defect detector detects defects based on said second servo signals.

15. The apparatus of claim 12, wherein said first servo signals include a tracking error signal and a focusing error signals; and said servo controller performs tracking control and focusing control of said pick-up as said servo control.

16. The apparatus of claim 15, wherein said defect detector detects a defect when said focusing error signal falls below a predetermined threshold.

17. An optical disk reproducing apparatus, comprising:

a pick-up forming a plurality of beam spots on an optical disk, and receiving reflections of said beam spots;

a servo signal generator generating servo signals associated with and based on at least one of said reflected beam spots;

a servo controller selecting servo signals associated with one of said beam spots and servo controlling said pick-up based on said selected servo signals; and a defect detector detecting a defect on said optical disk based on servo signals associated with one of said reflected beam spots, wherein said servo controller selects servo signals associated with one of said beam spots based on output from said defect detector;

said pick-up forms at least first and second beam spots on a same track, and receives reflections of said first and second beam spots;

said servo signal generator generates first servo signals and second servo signals based on said reflected first and second beam spots, respectively; and said servo controller servo controls said pick-up based on said first servo signals when said defect detector does not detect a defect, and servo controls said pick-up based on said second servo signals when said defect detector detects a defect.

18. The apparatus of claim 17, wherein said defect detector detects defects based on said first servo signals.

19. The apparatus of claim 17, further comprising:

an RF unit generating an RF signal based on said first servo signals.

20. The apparatus of claim 17, wherein said servo signals associated with each beam spot include a tracking error signal and a focusing error signals; and said servo controller performs tracking control and focusing control of said pick-up as said servo control.

21. An optical disk reproducing apparatus, comprising:

a pick-up forming a plurality of beam spots on an optical disk, and receiving reflections of said beam spots;

a servo signal generator generating servo signals associated with and based on at least one of said reflected beam spots;

a servo controller selecting servo signals associated with one of said beam spots and servo controlling said pick-up based on said selected servo signals; and a defect detector detecting a defect on said optical disk based on servo signals associated with one of said reflected beam spots, wherein said servo controller selects servo signals associated with one of said beam spots based on output from said defect detector; and wherein said pick-up forms at least first and second beam spots on different tracks of said optical disk, and receives reflections of said first and second beam spots;

said servo signal generator generates first servo signals and second servo signals based on said reflected first and second beam spots, respectively; and said servo controller servo controls said pick-up based on said first servo signals when said defect detector does not detect a defect, and servo controls said pick-up based on said second servo signals when said defect detector detects a defect.

22. The apparatus of claim 21, wherein said defect detector detects defects based on said first servo signals.

23. The apparatus of claim 21, further comprising:

an RF unit generating an RF signal based on said first servo signals.

24. The apparatus of claim 21, wherein said servo signals associated with each beam spot include a tracking error signal and a focusing error signals; and said servo controller performs tracking control and focusing control of said pick-up as said servo control.

25. An optical disk reproducing apparatus, comprising:
- a pick-up forming a plurality of beam spots on an optical disk, and receiving reflections of said beam spots;
- a servo signal generator generating servo signals associated with and based on at least one of said reflected beam spots;
- a servo controller selecting servo signals associated with one of said beam spots and servo controlling said pick-up based on said selected servo signals; and
- a defect detector detecting a defect on said optical disk based on servo signals associated with one of said reflected beam spot,
- wherein said servo controller selects servo signals associated with one of said beam spots based on output from said defect detector; and
- wherein said pick-up forms at least a first beam spot and a second beam spot on different tracks of said optical disk such that said second beam spot scans a track before said first beam spot, and receives a reflection of said first and second beam spot;
- said defect detector detects defects based on said reflected second beam spot;
- said servo signal generator generates first servo signals based on said reflected first beam spot; and
- said servo controller stores location information on a defect detected by said defect detector, stores said first servo signals generated prior to said first beam spot scanning a defect, determines when said first beam spot scans a defect based on said stored location information, servo controls said pick-up based on said first servo signals when said determination is that said first beam spot does not scan a defect, and servo controls said pick-up based on said stored first servo signals when said determination is that said first beam spot scans a defect.

26. The apparatus of claim 25, further comprising:
- an RF unit generating an RF signal based on said first servo signals.

27. The apparatus of claim 25, wherein
- said servo signals associated with each beam spot include a tracking error signal and a focusing error signals; and
- said servo controller performs tracking control and focusing control of said pick-up as said servo control.

28. A method of servo controlling in an optical disk reproducing apparatus, comprising:
- forming at least a first beam spot on an optical disk;
- receiving a reflection of said first beam spot;
- generating first servo signals from said reflected first beam spot;
- detecting defects in said optical disk; and
- servo controlling a pick-up based on said first servo signals currently generated by said generating step and output of said detecting step such that said servo control of said pick-up is based on said currently generated first signals when said detecting step does not detect a defect and said servo control is not performed based on said currently generated first servo signals when said detecting step detects a defect,
- wherein said forming step forms at least said first beam spot and a second beam spot on a same track of said optical disk such that said second beam spot lags behind said first beam spot, and receives said reflected first beam spot and a reflection of said second beam spot;
- said generating step generates said first servo signals and second servo signals based on said reflected first and second beam spots, respectively; and
- said servo controlling step servo controls said pick-up based on said first servo signals when said detecting step does not detect a defect, and servo controls said pick-up based on said second servo signals when said detecting step detects a defect.

29. A method of servo controlling in an optical disk reproducing apparatus, comprising:
- forming a plurality of beam spots on an optical disk;
- receiving reflections of said beam spots;
- generating servo signals associated with and based on each of said reflected beam spots;
- selecting servo signals associated with one of said beam spots; and
- servo controlling a pick-up based on said selected servo signals,
- wherein said forming step forms a first beam spot and a second beam spot on different tracks of said optical disk, and said receiving step receives a reflection of said first and second beam spots;
- said generating step generates first servo signals and second servo signals based on said reflected first and second beam spots, respectively; and
- said servo controlling step controls said pick-up based on said first servo signals when a defect is not detected, and servo controls said pick-up based on said second servo signals when a defect is detected.

30. A servo-control apparatus for an optical disk using a plurality of beams, comprising:
- an optical means for forming a plurality of beam spots on a same track of the optical disk;
- a means for generating a plurality of servo error signals by photoelectrically converting light from the beam spots; and
- a controller for selecting one of the servo error signals and servo-controlling said optical means based on the selected servo error signal.

31. An apparatus according to claim 30, wherein said optical means comprises:
- a beam separating means for diffractively separating a single laser beam into a main beam and a sub beam.

32. An apparatus according to claim 30, wherein said servo error signal generating means receives a plurality of lights reflected from the beam spots and generates tracking error signals and focusing error signals, respectively.

33. An apparatus according to claim 30, wherein said controller controls tracking or focusing of said optical means.

34. A servo-control apparatus for an optical disk using a plurality of beams, comprising:
- an optical means for separating a single laser beam into a plurality of beams forming a plurality of beam spots on a same track of the optical disk;
- a means for photoelectrically converting lights reflected from the beam spots into a plurality of corresponding electric signals;
- a means for generating a plurality of servo error signals with respect to said optical means from the converted electric signals;

a means for detecting a disk defect area based on one of the electric signals;

a means for selecting one of the servo error signals based on a result of the defect detection; and a means for servo-controlling said optical means in accordance with the selected servo error signals.

35. A servo-control method for an optical disk using a plurality of beams, comprising the steps of:

(a) performing a servo-control operation in accordance with a first beam spot among a plurality of beam spots formed on a same track of the optical disk; and (b) switching into a servo-control operation in accordance with a second beam spot when a disk defect is detected.

36. A method according to claim 35, wherein said first beam spot is ahead of said second beam spot.

37. A method according to claim 35, wherein the disk defect is detected based on a level of a photoelectrically converted signal of said first beam spot.

38. A method according to claim 35, further comprising:

(c) returning to the servo-control operation in accordance with said first beam spot when the detected defect state is released.

39. A method according to claim 38, wherein the release of the disk defect state is detected based on a level of a photoelectrically converted signal of said first beam spot.

40. A servo-control apparatus for an optical disk using a plurality of beams, comprising:

an optical member forming two beam spots on two neighboring tracks; and a controller memorizing information on defect state detected by a leading beam spot of said beam spots and servo-control information before occurrence of a defect, and performing servo-control by using the memorized servo-control information when a lagging spot of said beam spots arrives on a defect zone.

* * * * *